Jan. 1, 1924
J. M. LANSDEN
MOTOR VEHICLE
Filed Dec. 2, 1918
1,479,187
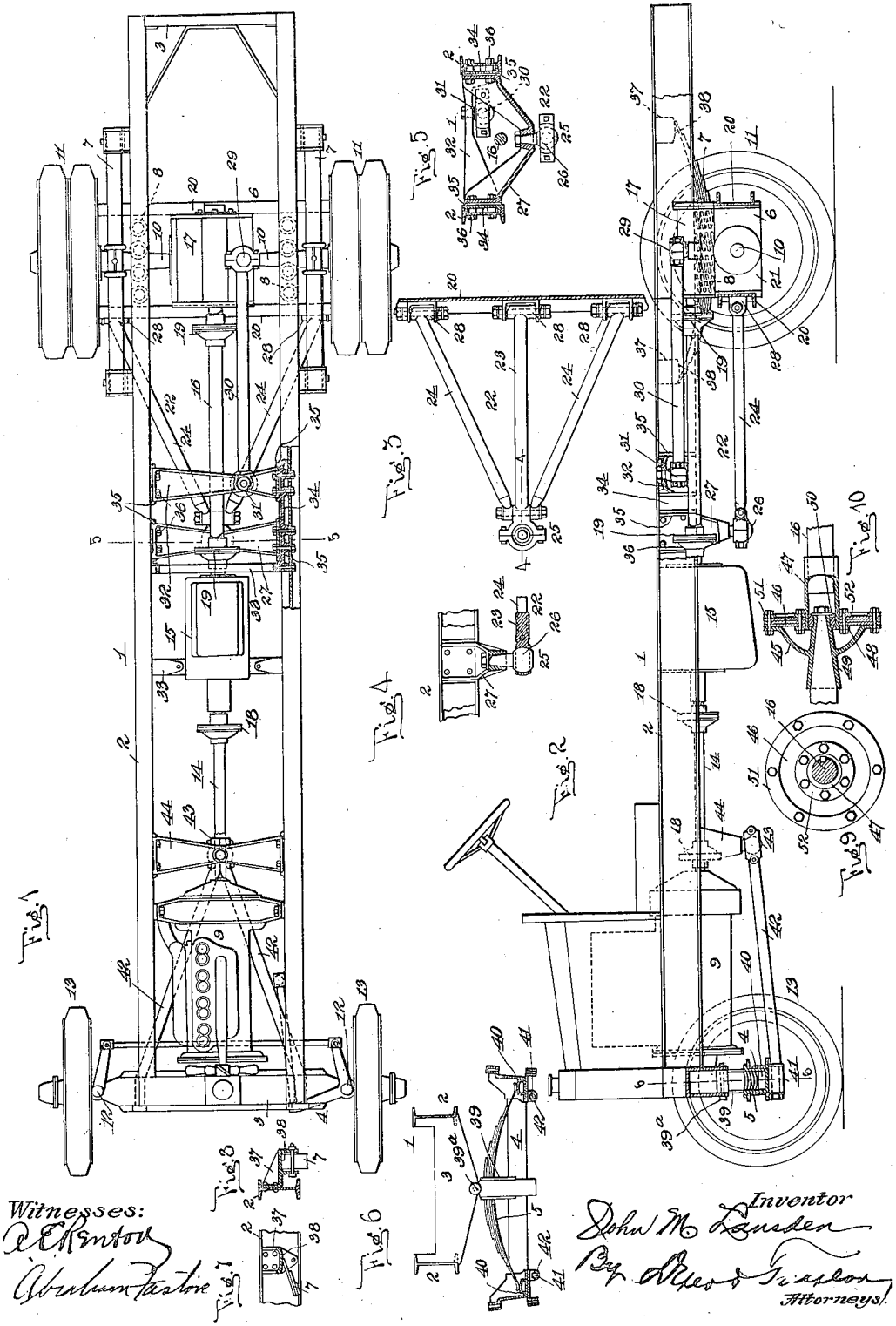

Patented Jan. 1, 1924.

1,479,187

UNITED STATES PATENT OFFICE.

JOHN M. LANSDEN, OF NEW YORK, N. Y.

MOTOR VEHICLE.

Application filed December 2, 1918. Serial No. 264,888.

*To all whom it may concern:*

Be it known that I, JOHN M. LANSDEN, a citizen of the United States, and a resident of the borough of Manhattan, city, county, and State of New York, have invented a certain new and useful Motor Vehicle, of which the following is a specification.

My invention relates to motor vehicles in which a more or less constant load is carried at or near one end of the chassis frame, generally the front and over the steering wheels, and a variable load carried at the opposite end of the frame and usually by the driving wheels and axle. In such a vehicle the strains incident to driving and to road shocks are unevenly distributed and the wear and tear on the tires, wheels, frame and driving and steering mechanisms are greatly augmented by such uneven distribution.

The objects of my invention are to eliminate uneven strains and stresses whereby the running qualities of such vehicles will be improved and the life and usefulness of the same be prolonged.

With these objects in view I have produced a device extremely flexible in character whereby shocks caused by unevenness of the road and those due to starting, running and stopping the vehicle will be evenly distributed over all of the parts affected and will not be localized in a few parts which will in a short time be worn out and have to be replaced.

These and further objects will be more fully pointed out in the following specification and accompanying drawings considered together or separately.

I have illustrated one embodiment of my invention in the accompanying drawings in which like parts in all of the several figures are designated by similar reference characters and in which—

Fig. 1 is a top plan view of a chassis embodying my invention.

Fig. 2 is a side elevation, partly in section, of the same.

Fig. 3 is a detail plan view of the rear axle radius rods.

Fig. 4 is a detail sectional view taken on the line 4—4 of Fig. 3.

Fig. 5 is a detail sectional view taken on the line 5—5 of Fig. 1.

Fig. 6 is a detail sectional view of the front spring arrangement.

Figs. 7 and 8 are detail views of the rear frame support, and

Figs. 9 and 10 are detail views of the shaft coupling.

My invention is illustrated as applied to a motor truck but I desire to have it understood that the invention may be utilized in whole or in part in connection with vehicles of other types.

Referring to the drawings, 1 designates the chassis frame of a motor truck. The frame comprises longitudinal I-beam frame members 2 and the usual transverse members 3. The frame is supported on a front axle 4 by means of a spring 5 and on a rear axle 6 through the intermediary of leaf springs 7 and spiral springs 8. A motor 9 is carried near the front end of the frame and drives the live members 10, 10 of the rear axle 6 and, through said members, the rear or driving wheels 11. The front axle 4 carries on knuckles 12 the usual steering wheels 13 which are operated by the usual steering gear.

The driving shaft extends along the center line of the frame from the motor to the usual differential on the rear axle and is preferably divided into six sections, one in the motor, a section 14 between the motor and the transmission 15, two sections in the transmission with the usual clutch mechanism between them, a section 16 between the transmission and the differential, and a final section in the differential casing 17.

The shaft section 14 is connected to the motor crank shaft and to the transmission by means of flexible couplings 18 which will permit of relative movement of the motor and transmission casing. The shaft section 16 is likewise connected to the transmission section and to the differential section by flexible couplings 19, to permit of relative movement of those parts.

The rear axle 6 is preferably a built-up structure comprising two channel beams 20 extending across the frame, and end members 21 whereby a box-like frame open at top and bottom is produced. The differential casing is supported within this frame and the inner bearings of the axle elements 10, 10 form parts of the said casing. The outer bearings of the live shaft sections 10, 10 are carried by the end members 21 of the axle frame, and the springs 7 and 8 are supported on the stationary axle frame.

Secured to one of the channel beams 20 of the rear axle, preferably the forward beam, is a triangular driving element 22. The driving element is preferably composed of a center member 23, parallel to the longitudinal central line of the chassis frame, and two side members 24, 24.

Each side member is attached to a beam 20 near one end thereof in proximity to a wheel, and a line drawn through the bearings of the members will form the base of the triangle. The side members 24, 24 converge to a point in the longitudinal center of the chassis frame and are attached to the frame by means of a ball and socket joint 25 one member 26 of which is carried by a transverse frame member 27 which is rigidly secured to the members 2, 2. The rear end of each member 23 and 24 is secured in a bracket 28 rigidly secured to the axle beam.

The chassis frame as a whole may move in any direction relatively to the axle except in a direction longitudinally of the frame while the ends of the axle may move vertically independently of the position of the center of the axle and relatively to the chassis frame.

The element 22 transmits the tractive effort of the wheels 11 to the longitudinal center of the frame of the chassis whence it is distributed equally to both sides of the frame and to the body of the vehicle. The driving strain will be transmitted by the three rods 23 and 24 and strains from each end of the axle, as by one or both wheels encountering obstacles, will be transmitted by one or the other of the rods 24.

Carried by the differential casing is one member of a universal joint 29 the other member of which forms part of a torque rod 30 the front end of which is connected by a universal joint 31 to a transverse member 32 which in turn is rigidly secured to the chassis members 2, 2.

The transverse members 27 and 32 together with the support 33 for one end of the transmission housing 15 are carried in liners 34 one on each frame member 2. Each liner fits within the channel of an I-beam bearing against the web thereof and against the inner surfaces of the flanges of the beam. The liners are provided with vertical guideways 35 into which the transverse members rest and the bolts 36 by which the liners are secured to the beams also act to secure the members 27, 32 and 33 in position. The member 27 is offset downwardly to bring the drive element 22 in line with the centers of the driving wheels 11, 11 and to retain the drive element normally in a horizontal position. The member 32 is offset upwardly to normally hold the torque rod 30 in the horizontal position. The offsetting of the members 27 and 33 also permits of the passage of the drive shaft element 16, whereby the drive shaft will normally extend horizontally between the motor and differential and for its entire length.

The length of the transverse members 27, 32 and 33 is less than the distance between the frame members whereby the members may be readily removed from the frame for alteration or repair. All thrusts transmitted from the rear axle either through the element 22 or the rod 30 are taken by the guideways 35 and transmitted to the frame members by all of the bolts 36 of each liner and consequently a much smaller number of bolts is required than if each cross member were separately and individually bolted to the frame and the frame beams are much stronger than if the larger number of bolt holes were cut therein.

Each frame member 2 has secured thereto near the rear end thereof a pair of spaced brackets 37 each having a lower, curved face 38. These faces 38 rest upon the ends of the semi-elliptic springs 7 which are rigidly attached to the rear axle at their centers. The springs are not secured to the brackets but the latter simply rest upon the springs and the weight of the vehicle, and its contents, are the only means of engaging the brackets with the springs 7.

Applicant makes no claim on the rear axle construction herein shown but the same forms the subject matter of a co-pending application for patent.

The front axle 4 carrying the steering wheels 13 is pivoted at 39ª to the forward transverse member 3. The connection between the member 3 and the axle is by means of a block 39 vertically movable in a guide on the axle proper. The block has rigidly secured thereto the front spring 5 which is of semi-elliptic character and the position of which is reversed relatively to the rear axle leaf springs 7. The ends of the spring 4 are free and rest upon the upper, curved faces of blocks 40 carried on the front axle member 4 near the ends thereof. The spring 5 and block 39 form part of the axle, which is pivoted to the frame at 39ª.

The front axle construction is not claimed herein but is made the subject matter of a copending application for patent.

Carried in bearings 41 near each end of the front axle 4 is a triangular stay or distance member 42, which extends rearwardly and converges toward the center line of the frame. At its rear end the member 41 is secured to the movable member of a universal joint 43 the stationary member of which is carried by a transverse frame element 44 similar to and secured to the longitudinal frame beams 2 in the same manner as is the member 27. This construction provides a three point connection between the chassis frame and the axle whereby the parts are always in proper alignment.

The element 44 is bowed downward in order to bring the center of the triangular element formed of the rods 41 on a line with the horizontal centers of the front or steering wheels 13 and to permit of the passage of the drive shaft from the motor to the transmission.

The pivotal connection of the axle 4, with the frame at 39ª and the connection of the stay member 42 to the frame by the universal joint 43 in longitudinal alinement with the pivot 39ª will permit lateral tilting of the axle relatively to the frame without disturbing the position of the latter. This movement of the axle will prevent objectionable "winding" and distortion of the vehicle frame due to road shocks, to inequalities of the load or of the road without putting undue strains on the wheels and tires.

The tractive force of the driving wheels will be transmitted to the steering wheels through the center line of the frame and the stay member 42, and shocks occasioned by obstructions at one end of the axle will be distributed to the entire frame of the vehicle by means of the connection to the chassis frame at the longitudinal center thereof.

The shaft section 16, the thrust element 22 and the radius rod 30 are of the same length, and as they are all pivotally connected to the same member mainly, the axle 6 and movable relatively to the frame to which all of them are connected the said parts 16, 22 and 30 are always in parallelism and all strains and stresses are equally distributed among them and any movement of one caused by flexing of the springs 7 and 8 or either of them, or to the tendency of the axle 6, as a whole, to rotate will be equally distributed among all of such elements and by them transmitted to the frame which will be free to move in all directions relatively to the axles and the road.

The three point suspension of the chassis frame will permit great flexibility of the vehicle, which will be increased by the three-point connections between the axles and the longitudinal center of the frame. The axles will be maintained in proper relation to the frame and at right angles to the longitudinal center thereof and road shocks at one end of an axle will be equally distributed across the axle and transmitted to the frame as a whole.

The parallelism of the connections between the driving axle and the frame is important in that each of the connection members will move to the same extent by relative movements of the frame and axle, and the strains and stresses will be equally distributed.

The operation of the device will be obvious from the above description.

The shaft couplings 18 and 19 are identical in construction. Each comprises an annular member 45 rigidly secured to one end of one shaft section and to which is bolted or otherwse secured a plurality of flexible discs 46. The discs are perforated at their centers and engage over a sleeve 47 secured against rotation to the end of the adjoining shaft section. The sleeve 47 is preferably secured in place by means of a key. The discs 46 are bolted to peripheral flange 48 on the sleeve 47. The member 45 is provided with a sleeve 49 by means of which it is secured to its shaft section. The end of the sleeve 49 carries a spherical element 50 on which the sleeve 47 finds a bearing. A ring 51 is secured in place on the discs opposite the member 45 and a disc 52 is placed opposite the flange 48 on the sleeve 47.

The discs 46 are preferably of rubberized textile fabric such as used in tire shoes and a plurality of thin discs is used instead of a single thick disc because of the greater flexibility of the former. The power is transmitted from shaft section to the other through the discs which, because of their non-rigid nature, will permit relative movement of the shaft sections.

I desire to have it understood that instead of employing discs of the material described any other material possessing the requisite strength and pliability may be used.

The joint is dust proof, is cheap of manufacture, is easily installed and may be readily dismantled for the purpose of renewal or repair.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention what I claim and desire to secure by Letter Patent of the United States is:—

1. A vehicle comprising a frame, a motor carried by the frame and in the longitudinal center thereof, a driving axle, a shaft connecting the motor and axle, a flexible joint in the shaft, a thrust element pivoted to the axle, and a flexible connection between the thrust element and the frame, said connection being in the longitudinal center of the frame and in proximity to joint in the shaft, the said shaft and thrust element lying in parallel planes.

2. A vehicle comprising a frame, a motor carried by the frame and in the longitudinal center thereof, a driving axle, a shaft connecting the motor and axle, said shaft being in sections, flexible joints between the sections whereby one of said sections may move relatively to the adjoining section, a thrust element pivoted to the axle, a flexible connection between the thrust element and the frame, said connection being in the longitudinal center of the frame, a shaft section in a plane parallel to the plane of the thrust element, the joints connecting the said shaft section with adjoining sections being in proximity to the connections of the thrust element and the axle and frame whereby when the axle moves relatively to the frame the said shaft section and thrust element will be moved to the same extent and in the same direction.

3. A vehicle comprising a frame, a motor carried by the frame and in the longitudinal center thereof, a driving axle, a shaft connecting the motor and axle, said shaft being in sections, flexible joints between the sections whereby one of said sections may move relatively to the adjoining section, a thrust element pivoted to the axle in line with the horizontal center thereof, a flexible connection between the thrust element and the frame, said connection being in the longitudinal center of the frame, a shaft section in a plane parallel to the plane of the thrust element, the said shaft section and thrust element being of equal length whereby when the axle moves relatively to the frame the said shaft section and thrust element will be moved to the same extent and in the same direction.

4. A vehicle comprising a frame having longitudinal members and transverse members, a front axle and a rear axle, wheels carried by the axles, springs interposed between the frame and the wheels, the engagement of the frame and axles through the springs being by gravity alone, a thrust element carried by an axle and pivoted in the longitudinal center of the frame to a transverse member, a torque member pivoted to the same axle and to a transverse member, said thrust element and torque member being of the same length.

5. A vehicle comprising a frame having longitudinal members and transverse members, a front axle and a rear axle, wheels carried by the axles, springs interposed between the frame and the wheels, the engagement of the frame and axles through the springs being by gravity alone, a thrust element carried by an axle and pivoted in the longitudinal center of the frame to a transverse member, a torque member pivoted to the same axle and to a transverse member, said thrust element and torque member being of the same length, the pivoted points of said member and element being at approximately the same distance from the longitudinal center of the axle.

6. A vehicle comprising a frame having longitudinal and transverse members, an axle, a spring between the frame and axle, a thrust element pivoted to the axle and to a transverse member, a liner carried by each longitudinal frame member, there being vertical guides in each liner, the ends of said transverse member engaging the guides, means for securing the liners to the longitudinal frame members, the said securing means acting to retain the transverse members in the guides.

7. A vehicle comprising a frame having longitudinal and transverse members, an axle, a spring between the frame and axle, a thrust element pivoted to the axle and to a transverse member, a torque member pivoted to the axle and to a transverse member, a liner carried by each longitudinal frame member, there being separate vertical guides in each liner, the ends of said transverse members engaging the guides, means for securing the liners to the longitudinal frame members, the said securing means acting to retain the transverse members in the guides.

8. A vehicle comprising a frame having longitudinal members and transverse members, a front axle and a rear axle, wheels carried by the axles, springs interposed between the frame and the wheels, a thrust element carried by an axle and pivoted in the longitudinal center of the frame to a transverse member, a torque member pivoted to the same axle and to a transverse member, said thrust element and torque member being of the same length.

9. A vehicle comprising a frame having longitudinal members and transverse members, a front axle and a rear axle, wheels carried by the axles, springs interposed between the frame and the wheels, a thrust element carried by an axle and pivoted in the longitudinal center of the frame to a transverse member, a torque member pivoted to the same axle and to a transverse member, said thrust element and torque member being of the same length, the pivoted points of said member and elements being at approximately the same distance from the longitudinal center of the axle.

10. A vehicle comprising a frame having longitudinal and transverse members, and an axle, wheels carried by the axle, springs interposed between the frame and axle, a thrust element pivoted at one end thereof to the axle and pivoted at its other end to the frame in the longitudinal center line of the frame, a torque member pivoted at one end thereof to the axle and pivoted at its other end to the frame, an engine carried by the frame, a propeller shaft driven by the engine, connections between the propeller shaft and wheels, said shaft being in sections, flexible joints between the sections, one of said sections being of approximately the same length as the thrust element and torque member, said shaft section, element and member lying parallel to each other, the joints of the shaft section and the pivotal points of the element and member being in approximately the same vertical planes.

This specification signed and witnessed this 21st day of November, 1918.

JOHN M. LANSDEN.

Witnesses:
ABRAHAM FASTONE,
A. E. RENTON.